(12) United States Patent
Umbehocker

(10) Patent No.: US 9,473,577 B2
(45) Date of Patent: Oct. 18, 2016

(54) DYNAMIC PROVISIONING OF A VIRTUAL STORAGE APPLIANCE

(71) Applicant: OS NEXUS, Inc., Mercer Island, WA (US)

(72) Inventor: Steven Michael Umbehocker, Mercer Island, WA (US)

(73) Assignee: OS NEXUS, INC., Mercer Island, WA (US)

( * ) Notice: Subject to any disclaimer, the term of this patent is extended or adjusted under 35 U.S.C. 154(b) by 0 days.

(21) Appl. No.: 14/734,866

(22) Filed: Jun. 9, 2015

(65) Prior Publication Data

US 2015/0281358 A1    Oct. 1, 2015

Related U.S. Application Data

(63) Continuation of application No. 13/434,247, filed on Mar. 29, 2012, now Pat. No. 9,058,107.

(60) Provisional application No. 61/468,959, filed on Mar. 29, 2011.

(51) Int. Cl.
```
G06F 12/00    (2006.01)
H04L 29/08    (2006.01)
G06F 3/06     (2006.01)
H04L 12/24    (2006.01)
G06F 12/02    (2006.01)
```

(52) U.S. Cl.
CPC ......... *H04L 67/1097* (2013.01); *G06F 3/0604* (2013.01); *G06F 3/067* (2013.01); *G06F 3/0631* (2013.01); *G06F 3/0665* (2013.01); *H04L 41/0806* (2013.01); *G06F 12/023* (2013.01)

(58) Field of Classification Search
None
See application file for complete search history.

(56) References Cited

U.S. PATENT DOCUMENTS

| | | |
|---|---|---|
| 6,971,005 B1 | 11/2005 | Henry et al. |
| 2010/0058334 A1 | 3/2010 | Mohindra et al. |
| 2010/0299523 A1 | 11/2010 | Henry et al. |
| 2011/0078682 A1* | 3/2011 | Doan et al. ............ 718/1 |
| 2011/0161649 A1 | 6/2011 | Bert |
| 2011/0219234 A1 | 9/2011 | Bogner |
| 2014/0033242 A1 | 1/2014 | Rao et al. |

OTHER PUBLICATIONS

Office Action dated Jan. 31, 2014 for U.S. Appl. No. 13/434,247, 13 pages.
Final Office Action dated Jun. 19, 2014 for U.S. Appl. No. 13/434,247, 14 pages.
Office Action dated Oct. 14, 2014 for U.S. Appl. No. 13/434,247, 15 pages.

* cited by examiner

*Primary Examiner* — Brian Peugh
(74) *Attorney, Agent, or Firm* — Amin, Turocy & Watson, LLP

(57) ABSTRACT

Systems, methods, and apparatus for facilitating dynamic provisioning of a virtual storage appliance in a cloud computing environment are presented herein. A storage system management component can provision storage from a storage medium to facilitate access of at least a portion of the storage by a virtual storage appliance (VSA) based on a request for at least one resource associated with the VSA. Further, a network management component can provision the VSA to facilitate the access of the portion of the storage by the VSA. Furthermore, a storage fabric management component can configure a network to facilitate the access of the portion of the storage by the VSA via the network.

20 Claims, 11 Drawing Sheets

DYNAMIC PROVISIONING OF A VIRTUAL STORAGE APPLIANCE

CROSS REFERENCE TO RELATED APPLICATIONS

This application is a continuation application of U.S. patent application Ser. No. 13/434,247 filed Mar. 29, 2012 and entitled "DYNAMIC PROVISIONING OF A VIRTUAL STORAGE APPLIANCE" which claims priority to U.S. Provisional Application Ser. No. 61/468,959 filed Mar. 29, 2011 and entitled "METHOD AND SERVICES FOR THE DYNAMIC PROVISIONING OF VIRTUAL STORAGE APPLIANCES", the entireties of each are incorporated herein by reference.

TECHNICAL FIELD

This disclosure relates generally to data storage including, but not limited to, dynamic provisioning of a virtual storage appliance.

BACKGROUND

Although conventional processing systems can utilize and deploy virtual servers in cloud computing environments to improve load balancing of applications, conventional techniques cannot adequately provide dynamic provisioning of customized virtual storage appliances (VSAs) in such environments.

The above-described deficiencies of today's virtual server environments and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In accordance with one or more embodiments and corresponding disclosure, various non-limiting aspects are described in connection with dynamically provisioning a virtual storage appliance (VSA) in a cloud computing environment. In one or more aspects, storage network component(s), e.g., storage network(s), virtual local area networks (VLANs), virtual storage area networks (VSANs), virtual host bus adaptors (HBAs), etc. communicatively coupled to a VSA can enable the VSA to provide end-users with all the features of a dedicated storage system without the cost having to purchase and configure additional hardware for each new system. In one or more other aspects, components of a cloud computing environment can be intelligently analyzed and new VSAs can be dynamically deployed with minimal or no human intervention. As such, companies and cloud service providers can deploy VSAs en-mass for their users and customer base in an automated fashion, monitor the VSAs, and greatly reduce the cost of managing complex storage environments.

For instance, a storage system management component can provision storage from a storage medium, e.g., a storage system, a storage appliance, a solid state disk (SSD), heterogeneous storage, etc. to provide dedicated storage for the virtual storage appliance. Further the storage management component can configure access of at least a portion of the storage, e.g., so that the portion can be utilized by a virtual storage appliance (VSA), e.g., server, compute server, virtual server, etc. based on a request for resource(s) to be associated with the VSA. Further, a cloud management component can provision the VSA based on policies, and facilitate access of the portion of the storage by the VSA.

In another embodiment, a cloud provisioning portal can receive the request via a network, e.g., Internet. Further, the resource(s) can include the VSA resource requirements and/or at least a portion of the storage requirements. In yet another embodiment, the request can define a location where the VSA should be deployed and/or a geographic or datacenter location of the portion of the storage to be provisioned. In one embodiment, the request for VSA provisioning or expansion can define a performance criterion, e.g., associated with a service level agreement (SLA), an amount of the storage, a minimum performance of the storage, a processing performance, etc.

In an embodiment, the cloud management component can provision the VSA utilizing at least a portion of the storage. For example, the cloud management component can create a boot image using snapshot mechanisms, e.g., within the portion of the storage, to facilitate the initial configuration of a new VSA. Further, the cloud management component can allocate, assign, etc. the portion of the storage to the VSA for use by the VSA. In another embodiment, the cloud management component can dynamically allocate the VSA in a hypervisor cluster, or virtual machine manager (VMM) cluster, as a virtual machine, operating platform, etc.

In yet another embodiment, a storage management component can dynamically create one or more virtual SANs for respective VSANs, and perform storage network zoning of a switch, or storage fabric(s), to facilitate the access of the portion of the storage by the VSA. For example, the switch can include storage technologies, e.g., Small Computer System Interface (SCSI), Internet SCSI (iSCSI), Fibre Channel (FC), FC over Ethernet (FCoE), SCSI-over-Fiber Channel, Serial Storage Architecture (SSA), Advanced Technology (AT) Attachment (ATA) interface, ATA over Ethernet (AoE), other Storage Area Network (SAN) protocol(s), etc. communicatively coupled between the VSA and the storage medium.

In an embodiment, the storage management component can configure the hypervisor to provision one or more virtual HBAs for the VSA so that the VSA can login to the switch, storage fabric(s), etc. and access back-end storage for the VSA as provided by, e.g., previous provisioning operation(s). Through dynamic discovery of fabric, system, and storage system configuration data, the storage management component can intelligently orchestrates configuration of appropriate elements of the cloud computing environment.

In one embodiment, a network configuration component can dynamically discover which VLAN the VSA should be added to, dynamically discover network information associated with the VSA, and utilize such information during VLAN configuration so as to restrict access to the VSA, e.g., to a given user, customer, etc.

In one embodiment, a license configuration component can allocate a license key that is associated with the VSA, and authorize the access of the portion of the storage by the VSA, based on the license key. In another embodiment, a monitor component can monitor performance of the VSA and/or the storage based on the access of the portion of the storage by the VSA.

In one non-limiting implementation, a method can include receiving, by a system including at least one processor, a request for a resource that is associated with a VSA. In one example, the request can include a request for the VSA and/or a request for storage space. In another example, the request can be received by the system via the Internet.

Further, the method can include provisioning, by the system, storage space from a tier of storage based on the request. In one embodiment, the tier of storage can be heterogeneous, including various forms, sizes, and/or qualities of computer-readable storage media, e.g., including fault-tolerance and high-availability levels. In another embodiment, the method can include provisioning, by the system, the VSA to facilitate access of the storage space by the VSA. In other embodiment(s), the provisioning the VSA can include allocating, by the system, at least a portion of the storage space to the VSA; creating, by the system, a snapshot of a boot drive of the VSA on the tier of the storage, or in an arbitrary pool of storage from another storage medium; allocating, by the system, the VSA in a hypervisor cluster as a virtual machine; and/or allocating, by the system, a license key to the VSA to facilitate the access of the storage space by the VSA.

In one embodiment, the method can include configuring, by the system, a component, e.g., storage fabric, VSAN, zoning of a VSAN, storage switch, network switch, VLAN, transmission media, etc. of a network communicatively coupled between the VSA and the storage space to facilitate the access of the storage space by the VSA.

In another embodiment, the method can include monitoring, by the system, performance of the VSA and/or the storage space based on the access of the storage space by the VSA.

In another non-limiting implementation, a method can include allocating storage from a computer-readable storage medium to a VSA in response to receiving a request for a resource that is to be associated with the VSA. Further, the method can include facilitating access to the storage by the VSA via a network.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

Figure 1:
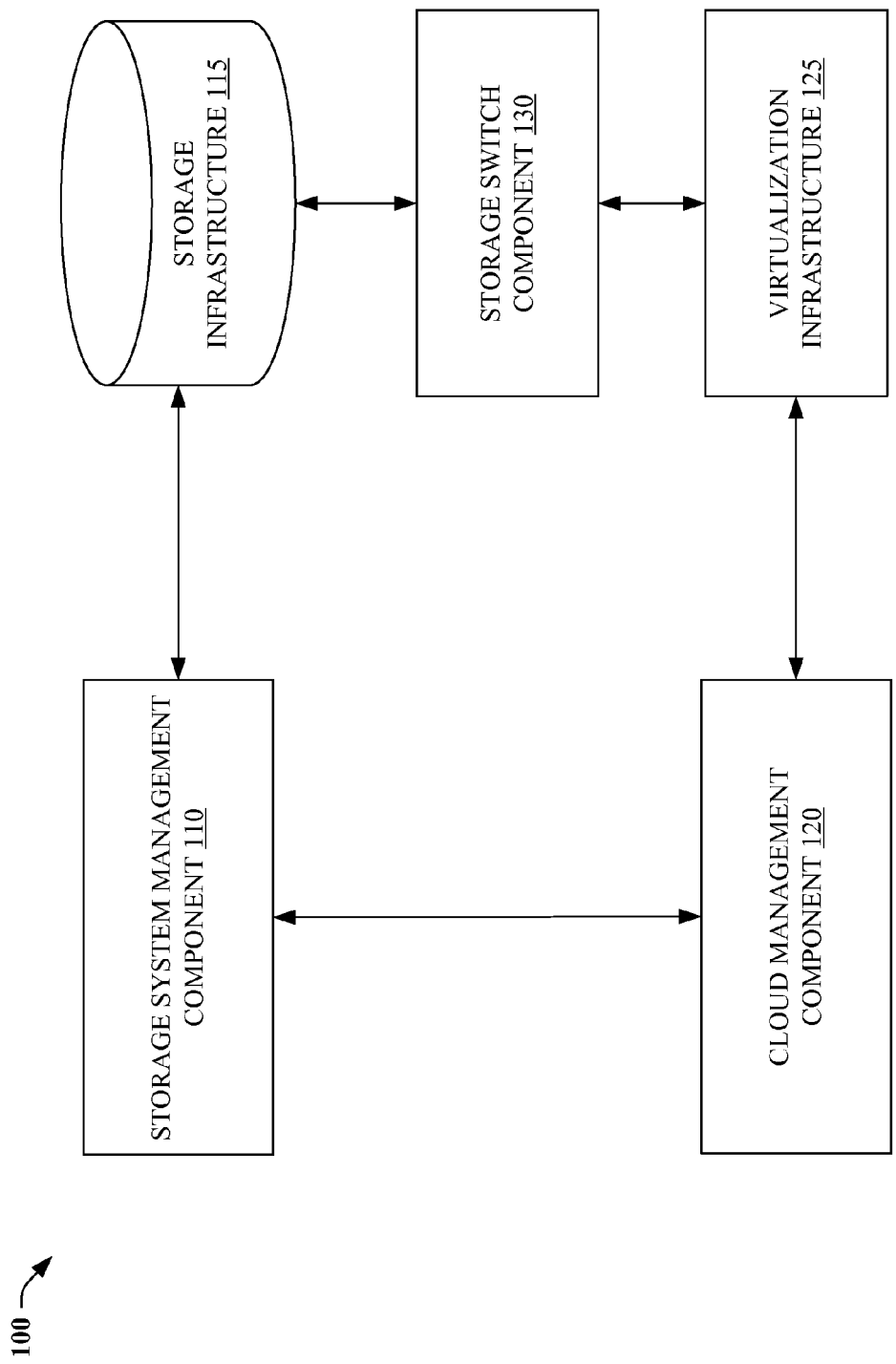
FIG. 1 illustrates a block diagram of a cloud computing infrastructure, in accordance with an embodiment.

Various non-limiting embodiments of systems, methods, and apparatus presented herein dynamically provision a virtual storage appliance in a cloud computing environment. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via storage system management component 110 (see below), to provision storage from a storage medium, e.g., tier of computer-readable storage media, to facilitate access of portion(s) of the storage by a virtual storage appliance (VSA) based on a request for resource(s) associated with the VSA. Further, the artificial intelligence system can be used, via cloud management component 120 (see below), to provision the VSA to facilitate the access of the portion(s) of the storage by the VSA.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As described above, conventional virtual computing techniques cannot adequately provide customized storage systems within virtual server environments. Compared to such technology, various systems, methods, and apparatus described herein in various embodiments can improve user experience(s) by dynamically provisioning a virtual storage appliance in a cloud computing environment.

Referring now to FIG. 1, a block diagram of a cloud computing infrastructure 100 is illustrated, in accordance with an embodiment. Aspects of cloud computing infrastructure 100, and systems, networks, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

Additionally, the systems and processes explained herein can be embodied within hardware, such as an application specific integrated circuit (ASIC) or the like. Further, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Cloud computing infrastructure 100 can include storage system management component 110, cloud management component 120, and storage switch component 130. In an aspect, storage system management component 110 can provision storage from a storage medium (not shown) of storage infrastructure 115 to facilitate access, via storage switch component 130, of portion(s) of the storage by a VSA (not shown) of virtualization infrastructure 125—based on a request for resource(s) associated with the VSA, e.g., a request for portions(s) of the storage, a request for the VSA, etc. In one aspect, the storage medium can include various computer-readable storage technologies, e.g., virtual hard disk device (VHD) file(s), physical SCSI device(s), Serial Advanced Technology Attachment (SATA) device(s), Serial Attached SCSI (SAS) device(s), Serial Storage Architecture (SSA) device(s), and/or solid state disk (SSD) device(s). In another aspect, storage switch component 130 can be communicatively coupled between storage infrastructure 115 and virtualization infrastructure 125 utilizing a Small Computer System Interface (SCSI), which is a peripheral, peer-to-peer interface that can be used, e.g., in personal computer (PC) server systems; a SCSI-over-Fiber Channel protocol; an SAS protocol; an Internet SCSI (iSCSI) protocol, which is an Internet Protocol (IP) based storage networking standard for linking data storage facilities and/or entities; an Advanced Technology (AT) Attachment (ATA) interface, an ATA over Ethernet (AoE) interface, other Storage Area Network (SAN) protocol(s), etc.

Further, cloud management component 120 can provision the VSA, e.g., based on one or more policies, and facilitate access of the portion(s) of the storage by the VSA. In one aspect, cloud management component 120 can provision the VSA utilizing portion(s) of the storage. For example, cloud management component 120 can create, e.g., using snapshot mechanism(s), a boot image from the portion(s) of the storage to facilitate configuration of the VSA. In another example, cloud management component 120 can dynamically allocate the VSA in a hypervisor cluster (see below) as a virtual machine.

Figure 2:
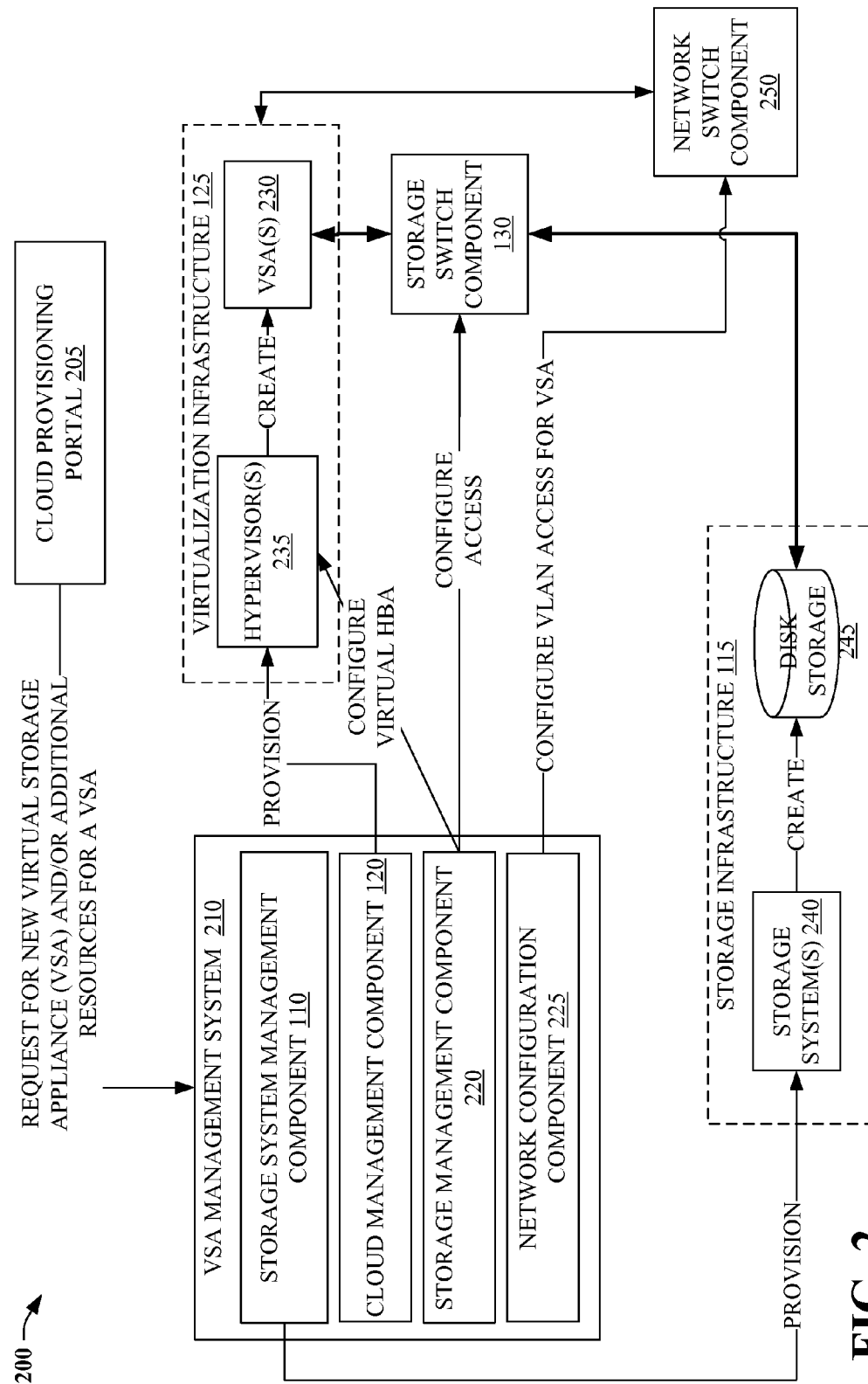
FIG. 2 illustrates a block diagram of another cloud computing infrastructure, in accordance with an embodiment.

Now referring to FIG. 2, a block diagram of another cloud computing infrastructure (200) is illustrated, in accordance with an embodiment. Cloud computing infrastructure 200 can include a VSA management system 210 including storage system management component 110, cloud management component 120, storage management component 220, and network configuration component 225. As illustrated, VSA management system 210 can be communicatively coupled to cloud provisioning portal 205, which can receive a request for resource(s) associated with the VSA via a network, e.g., via the Internet, a web portal, etc. In one example the request can include a request for the VSA and/or portion(s) of storage of storage infrastructure 115. In another example, the request can define a location of where the VSA should be deployed and/or a geographic and/or datacenter location of the portion(s) of the storage, e.g., to be provisioned. In yet another example, the request can define a performance criterion, e.g., associated with a service level agreement (SLA), an amount of the storage, a minimum performance of the storage, a processing performance, etc.

Storage system management component 110 can provision, via storage system(s) 240, storage from disk storage 245 to facilitate access, via storage switch component 130, of portion(s) of the storage by VSA(s) 230, based on the request for the resource(s). In an aspect, storage system(s) 240 can configure, modify, create, etc. computer-readable storage media of disk storage 245 including, for example, virtual hard disk device (VHD) file(s), physical SCSI device(s), Serial Advanced Technology Attachment (SATA) device(s), Serial Attached SCSI (SAS) device(s), Serial Storage Architecture (SSA) device(s), and/or solid state disk (SSD) device(s).

Further, cloud management component 120 can provision VSA(s) 230 using portion(s) of disk storage 245. In one example, cloud management component 120 can provision VSA(s) 230 utilizing boot storage and/or pool storage created, via storage system management component 110, from disk storage 245. In another example, cloud management component 120 can dynamically allocate VSA(s) 230 in hypervisor(s) 235, which can be included in a hypervisor, or virtual machine manager (VMM), cluster including more than one VSA. In this regard, hypervisor(s) 235 can implement VSA(s) 230 as virtual machine(s), operating platform(s), etc. that can share virtualized hardware resources associated with server platform(s) for executing respective instances of operating systems, etc.

Furthermore, storage management component 220 can configure storage switch component 130 to facilitate the access of the portion(s) of the storage by VSA(s) 230. For example, storage fabric management component 220 can configure various components associated with storage technologies including, e.g., SCSI, iSCSI, FC, SCSI-over-Fiber Channel, SSA, ATA interface, AoE, other SAN protocol(s), etc. communicatively coupled between VSA(s) 230 and disk storage 245. In one embodiment, storage management component 220 can dynamically create one or more virtual SANs for respective VSANs, and perform storage network zoning of a switch, or storage fabric(s), to facilitate the access of the portion(s) of the storage by VSA(s) 230.

In another embodiment, storage management component 220 can configure a hypervisor of hypervisor(s) 235 to provision one or more virtual HBAs for the VSA, so that the VSA can login to a switch, storage fabric(s), etc. associated with storage switch component 130 and access back-end storage for the VSA as provided by, e.g., previous provisioning operation(s).

In yet another embodiment, network configuration component 225 can dynamically discover which VLAN the VSA should be added to, dynamically discover network information associated with the VSA, and utilize such information during VLAN configuration, so as to restrict access to the VSA, e.g., to a given user, customer, etc.

Figure 3:
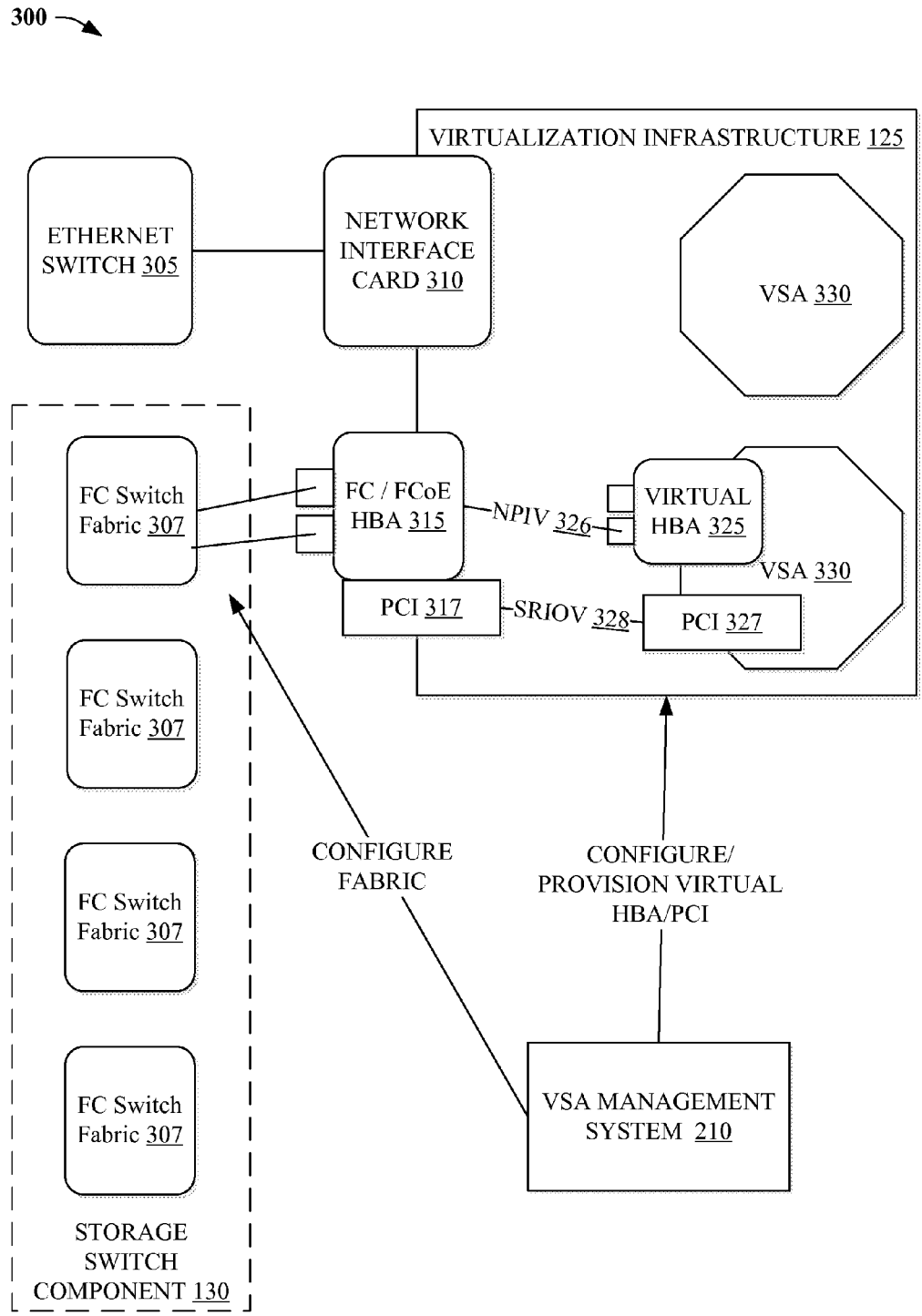
FIG. 3 illustrates a block diagram of a network switch component, in accordance with an embodiment.

In an embodiment, network configuration component 225 can configure VLAN access for the VSA via network switch component 250. Now referring to FIG. 3, a block diagram 300 of network switch component 250 communicatively coupled to VSA management system 210 and virtualization infrastructure 125 is illustrated, in accordance with an embodiment. VSA management system 210 can dynamically correlate an FC/FCoE host bus adapter (HBA), e.g., FC/FCoE HBA 315, or a Peripheral Component Interconnect (PCI) adapter, e.g., PCI 317, with FC switch fabric 307, for example, for configuration of FC switch fabric 307. Further, VSA management system 210 can dynamically provision virtual HBA 325, and/or virtual PCI bus, e.g., PCI 327, within VSA 330, e.g., communicatively coupling virtual HBA 325/PCI 327 to fabric 307 via FC/FCoE HBA 315/PCI 317, for example, using technologies such as N_Port ID Virtualization (NPIV), e.g., NPIV 326, and/or using technologies that can extend a virtual PCI bus into the VSA such as Single Root I/O Virtualization (SR-IOV), e.g., SRIOV 328. In some embodiments, FC technologies are not utilized, but Ethernet switch 305 and network interface card 310 can be dynamically configured, via VSA management system 210, to enable iSCSI traffic constrained to a specific VLAN for use by VSA 330.

Figure 4:
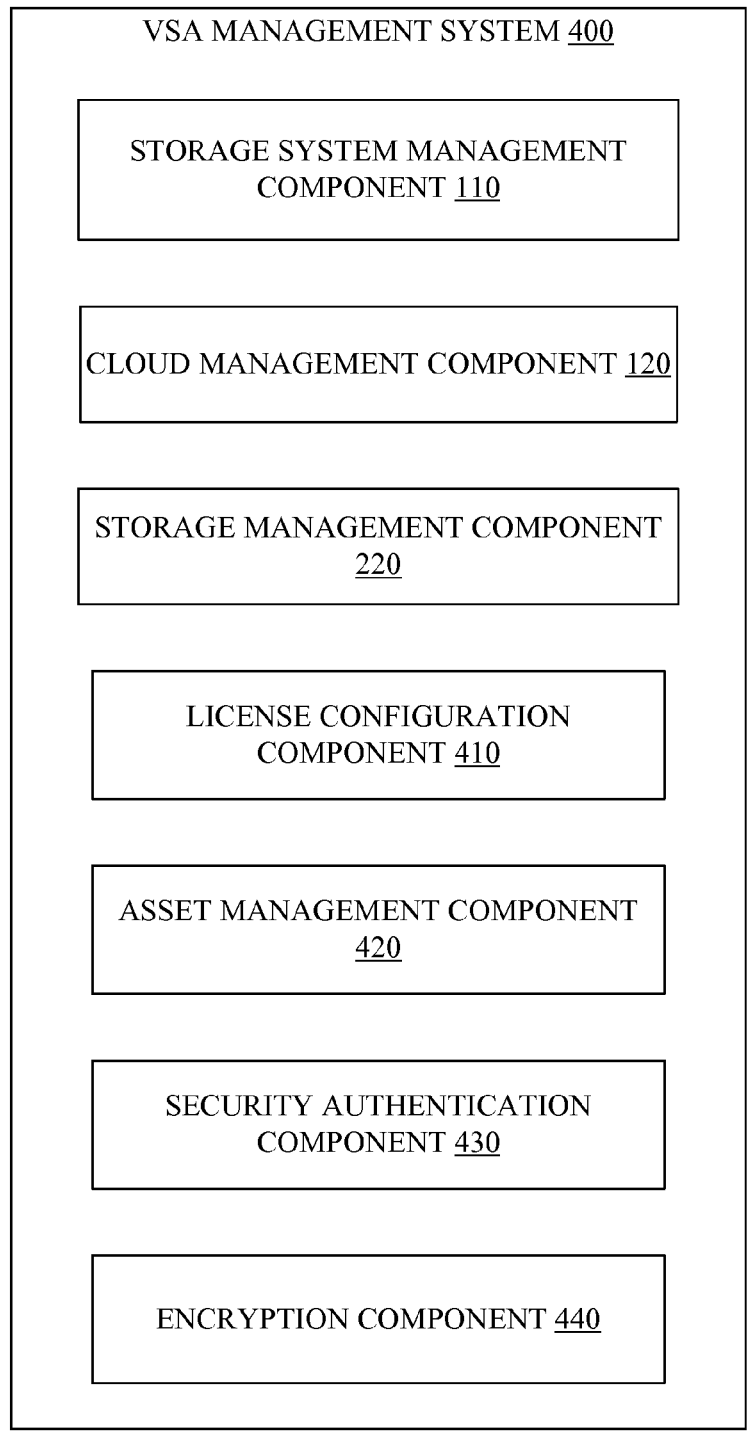
FIG. 4 illustrates a block diagram of a virtual storage appliance (VSA) management system, in accordance with an embodiment.

Referring now to FIG. 4, a block diagram of VSA management system 400 is illustrated, in accordance with an embodiment. VSA management system 400 includes components of VSA management system 210 (storage system management component 110, cloud management component 120, and storage management component 220) in addition to license configuration component 410, asset management component 420, security authentication component 430, and encryption component 440. In one or more embodiments, the VSA can be added to, and integrated with, an existing Lightweight Directory Access Protocol (LDAP) or Active Directory configuration, e.g., to enable authentication and authorization, for example, via security authentication component 430, using existing security infrastructure. Asset management component 420 can monitor, keep track of, etc. operator(s), owner(s), etc. of respective VSAs, and can monitor, keep track of, etc. resources that have been allocated to the respective VSAs, e.g., so that charge-back accounting can be done for the respective VSAs. Further, encryption component 440 can enable the VSA to automatically store associated data in an encrypted fashion, e.g., utilizing encryption technologies provided by storage system(s) 240, storage switch component 130, and/or the VSA to enable the VSA to automatically store data in an encrypted fashion as part of the VSA deployment.

License configuration component 410 can allocate a license key that is associated with VSA(s) 230, and can authorize the access of portion(s) of disk storage 245 by VSA(s) 230, based on the license key. Further, license configuration component 410 can automatically request and activate additional third ($3^{rd}$) party licenses within a switch, e.g., storage switch component 130, within a storage system, e.g., associated with storage infrastructure 115, and/or within a virtualization layer, e.g., virtualization infrastructure 125, as part of the provisioning process. In another embodiment, asset management component 420 can monitor performance of VSA(s) 230 and/or the portion(s) of disk storage 245.

Figure 5:
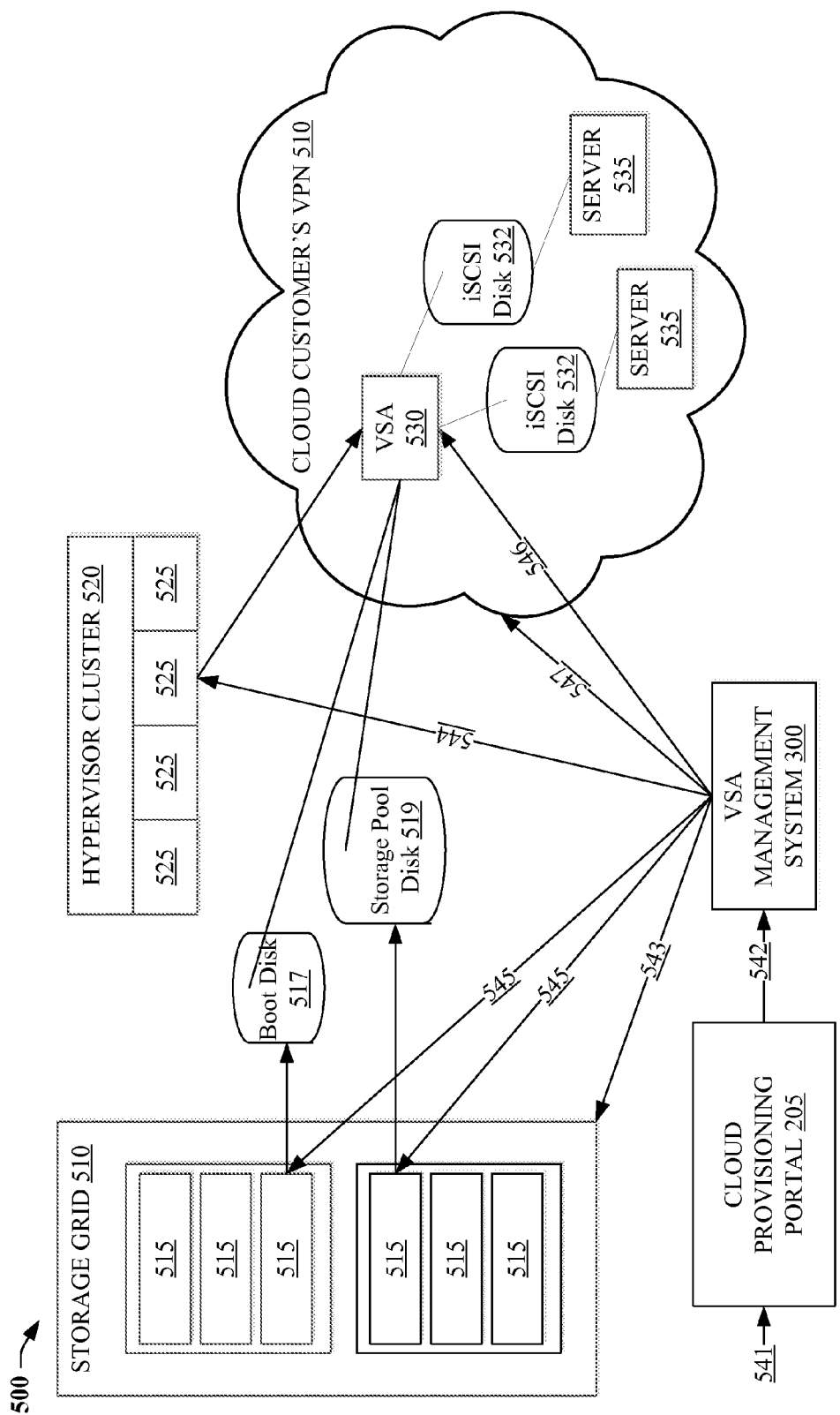
FIG. 5 illustrates a block diagram of yet another cloud computing infrastructure, in accordance with an embodiment.

FIG. 5 illustrates a block diagram of yet another cloud computing infrastructure (500), in accordance with an embodiment. At 541, cloud provisioning portal 205, which can include an Internet based interface, e.g., web portal, can receive Internet-based requests for new VSAs, e.g., VSA 530, and associated storage space, or specific tiers of storage, for such VSAs from respective customers. At 542, cloud provisioning portal 205 can initiate, based on one of the requests, an application programming interface (API) call to storage system management component 110 of VSA management system 300 to provision storage space, e.g., a storage cloud, storage pool 519, and/or a new VSA from storage grid 510.

At 543, storage system management component 110 can allocate the storage cloud, or storage pool 519, for the new VSA utilizing at least one high-availability (HA) storage system 515, e.g., cluster, failover cluster, etc. that includes computing device(s), processor(s), computer(s), etc. configured to provide continued service, e.g., during hardware/software faults, by immediately restarting crashed applications on another system without requiring administrative intervention, e.g., during failover. Further, VSA storage system management component 110 can snapshot a golden image of the new VSA to create boot disk 517.

At 544, cloud management component 120 can dynamically allocate a VSA virtual machine in hypervisor 525 of hypervisor cluster 520. At 545, cloud management component 120 can assign boot disk 517 and storage pool 519 to the new VSA, e.g., VSA 530. At 546, license configuration component 410 can dynamically allocate a new license key from a license manager (not shown) for the new VSA, and inject the new license key into the new VSA virtual machine. At 547, storage fabric management component 220 can dynamically configure, e.g., via storage switch component 130 (not shown), component(s) of a network communicatively coupled between the new VSA and the customer's VPN or VLAN, e.g., cloud customer's VPN 510, to facilitate access of the new VSA, e.g., of iSCSI disks 532, server 535, via cloud customer's VPN 510.

FIGS. 6-10 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
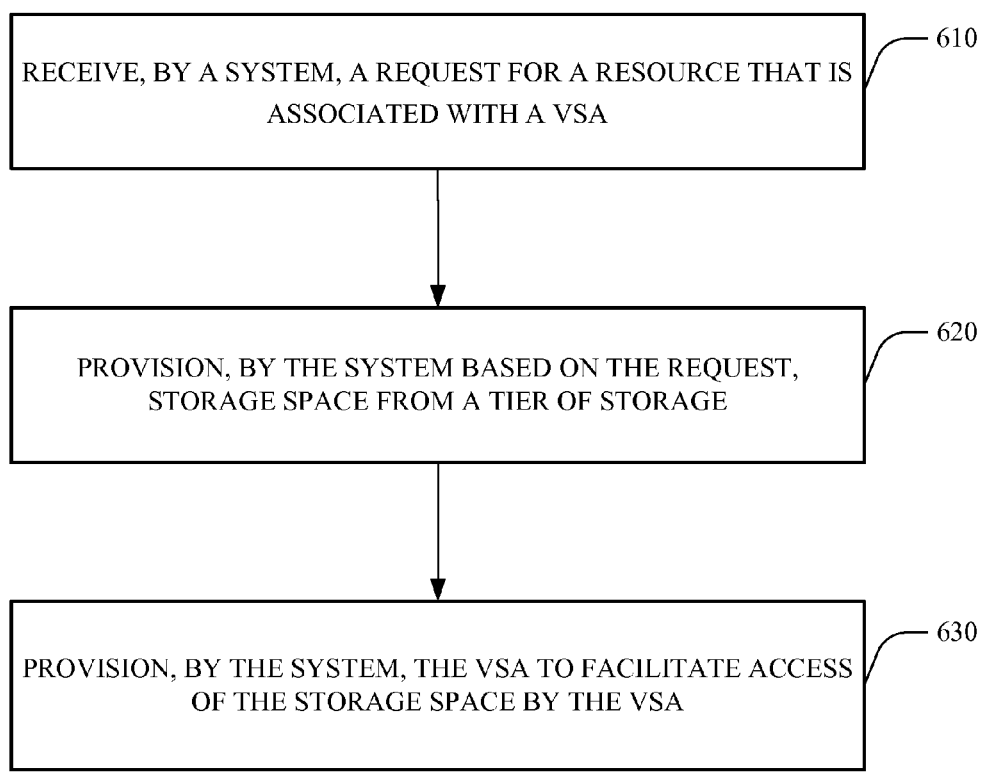
FIGS. 6-10 illustrate various processes associated with one or more cloud computing infrastructures, in accordance with an embodiment.
Figure 7:
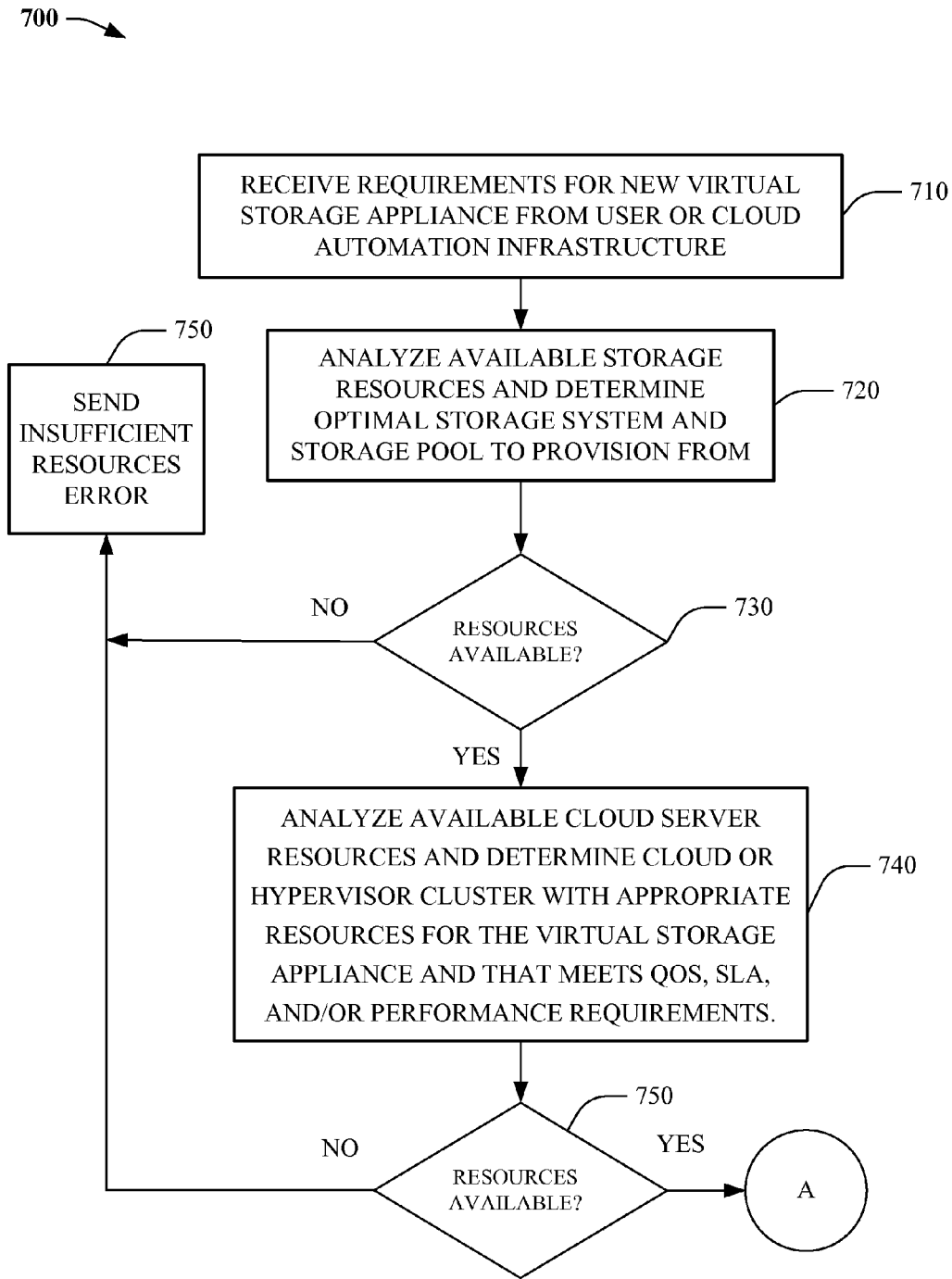
Figure 8:
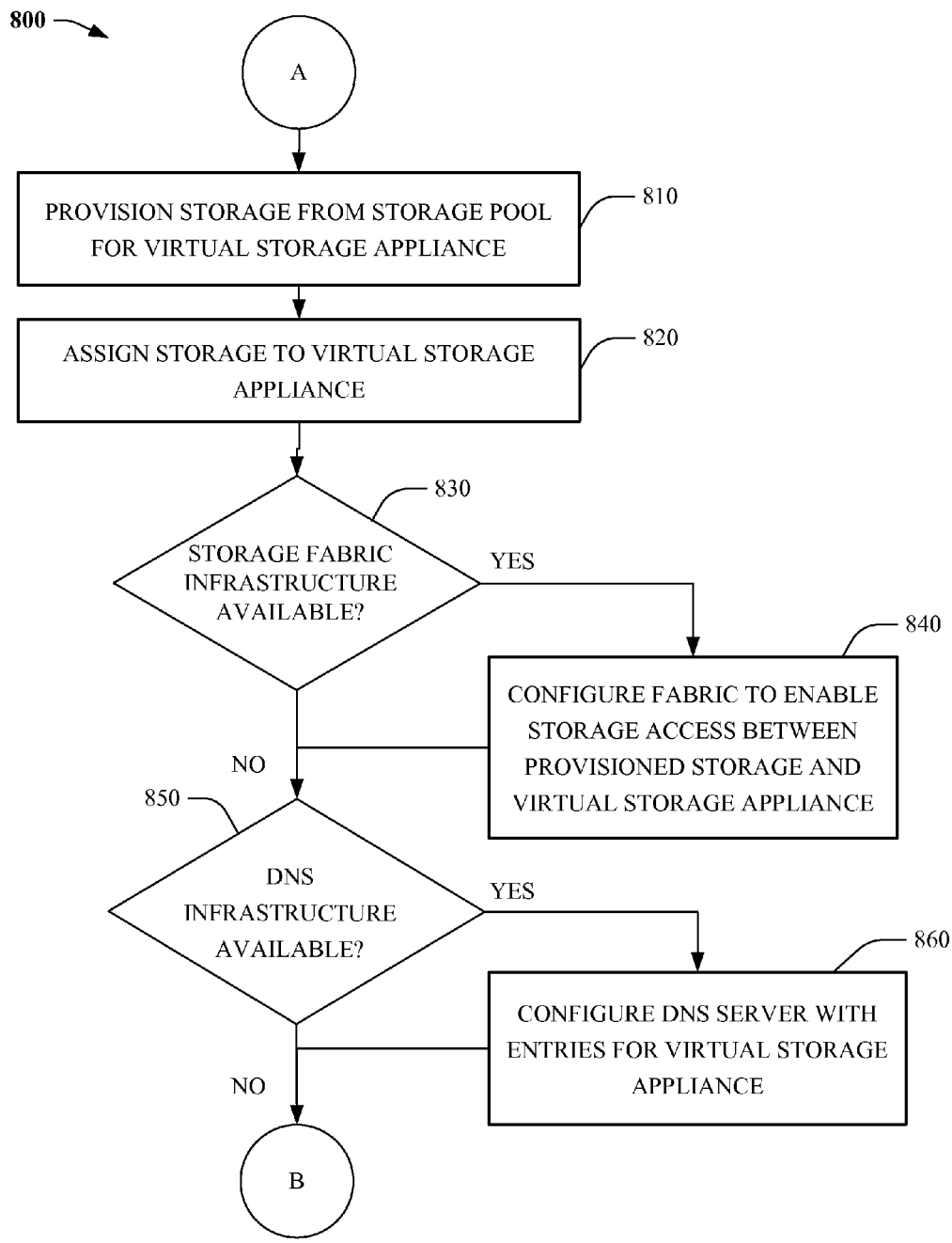
Figure 9:
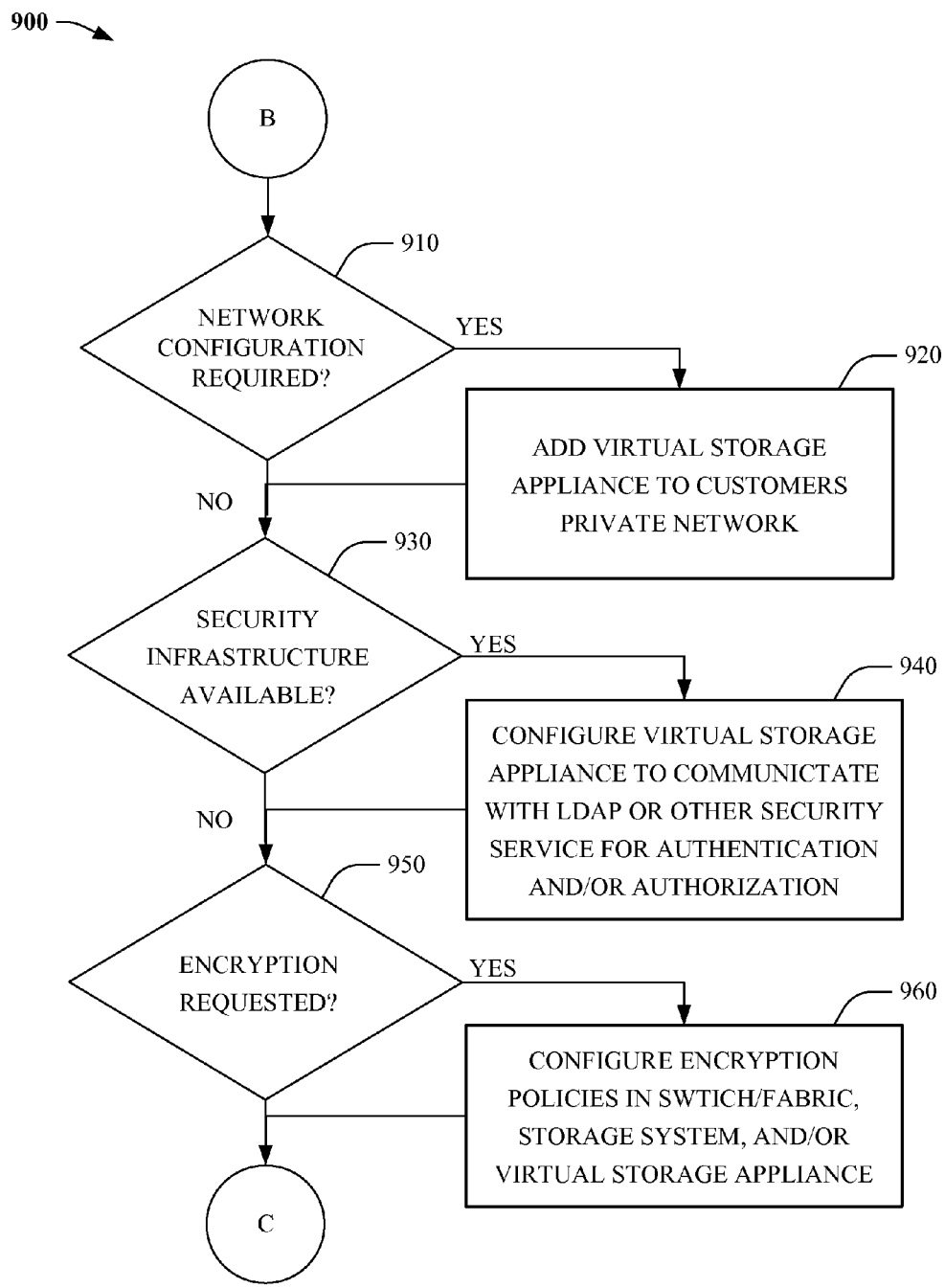
Figure 10:
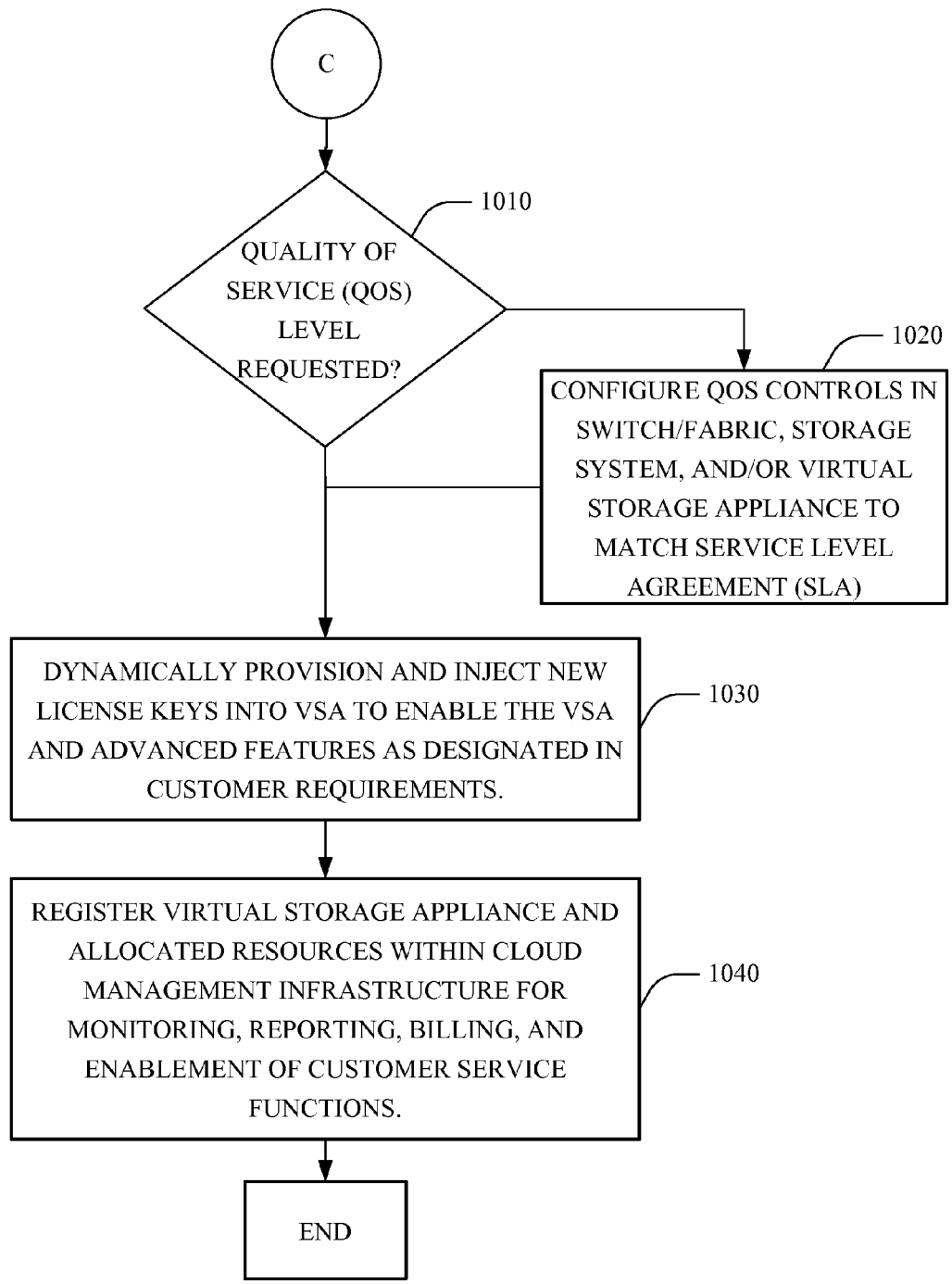

Referring now to FIG. 6, a process 600 associated with a VSA management system, e.g., 210, 400, etc. is illustrated, in accordance with an embodiment. At 610, a request for a resource that is associated with a VSA, new VSA, etc. can be received by a system, e.g., by VSA management system 210, 400, etc. In an aspect, the request can be received by the system via the Internet. In another aspect, the request can include a request for the VSA and/or a request to provision storage space associated with a VSA.

At 620, storage space can be provisioned by the system from a tier of storage, e.g., storage grid 510, based on the request. In one aspect, the tier of storage can be heterogeneous, including varies sizes and performances of computer-readable storage media. In another aspect, at least a portion of the storage space can be allocated by the system to the VSA. At 630, the VSA can be provisioned by the system to facilitate access of the storage space by the VSA. In yet another aspect, the VSA can be provisioned in response to a snapshot of a boot drive of the VSA being created on the tier of storage by the system. In one aspect, the VSA can be provisioned in response to the VSA being allocated in a hypervisor cluster as a virtual machine.

FIGS. 7-10 illustrate processes (700-1000) associated with another VSA management system, e.g., 210, 400, etc., in accordance with an embodiment. At 710, requirement(s) for a new VSA can be received from a user or a cloud automation infrastructure. At 720, available storage resources can be analyzed and an optimal storage system and storage pool can be determined to provision from. At 730, it can be determined whether such resources are available. If it is determined that such resources are not available, flow continues to 750, at which an insufficient resources error can be sent; otherwise, flow continues to 740, at which available cloud server resources can be analyzed, and a cloud or hypervisor cluster with appropriate resources for the VSA and that meets quality of service (QOS), SLA, and/or performance requirements can be determined. If it is determined at 750 that such resources are not available, then flow continues to 750; otherwise flow continues to 810, at which storage from the storage pool can be provisioned for the VSA. At 820, the storage can be assigned to the VSA.

At 830, if it is determined that storage fabric infrastructure is available, flow continues to 840, at which a storage fabric, e.g., fabric, can be configured to enable storage access between provisioned storage and the VSA; otherwise, flow continues to 850, at which it can be determined whether Domain Name System (DNS) infrastructure is available. If it is determined at 850 that DNS infrastructure is available, then flow continues to 860, at which a DNS server can be configured with entries for the VSA; otherwise flow continues to 910, at which it can be determined whether configuration of a network is required. If it is determined that network configuration is required, then flow continues to 920, at which the VSA can be added to a customer's private network, e.g., VPN, VLAN, etc. Otherwise, flow continues to 930, at which it can be determined whether security infrastructure is available.

If it is determined that security infrastructure is available, then flow continues to 940, at which the VSA can be configured to communicate with a Lightweight Directory Access Protocol (LDAP) or other security server for authentication and/or authorization. Otherwise, flow continues to 950, at which it can be determined whether encryption is requested. If encryption is requested, then flow continues to 960, at which encryption policies can be configured in a switch/fabric, storage system, and/or virtual storage appliance; otherwise, flow continues to 1010, at which it can be determined whether a quality of service (QOS) level is requested. If the QOS level is requested, then flow continues to 1020, at which QOS controls in the switch/fabric, storage system, and/or the VSA can be configured to match an SLA;

otherwise flow continues to 1030, at which a new license key can be dynamically provisioned and injected into the VSA to enable the VSA and advanced features as designated in customer requirements. At 1040, the VSA can be registered and allocated resources within a cloud management infrastructure for monitoring, reporting, billing, and enablement of customer functions.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
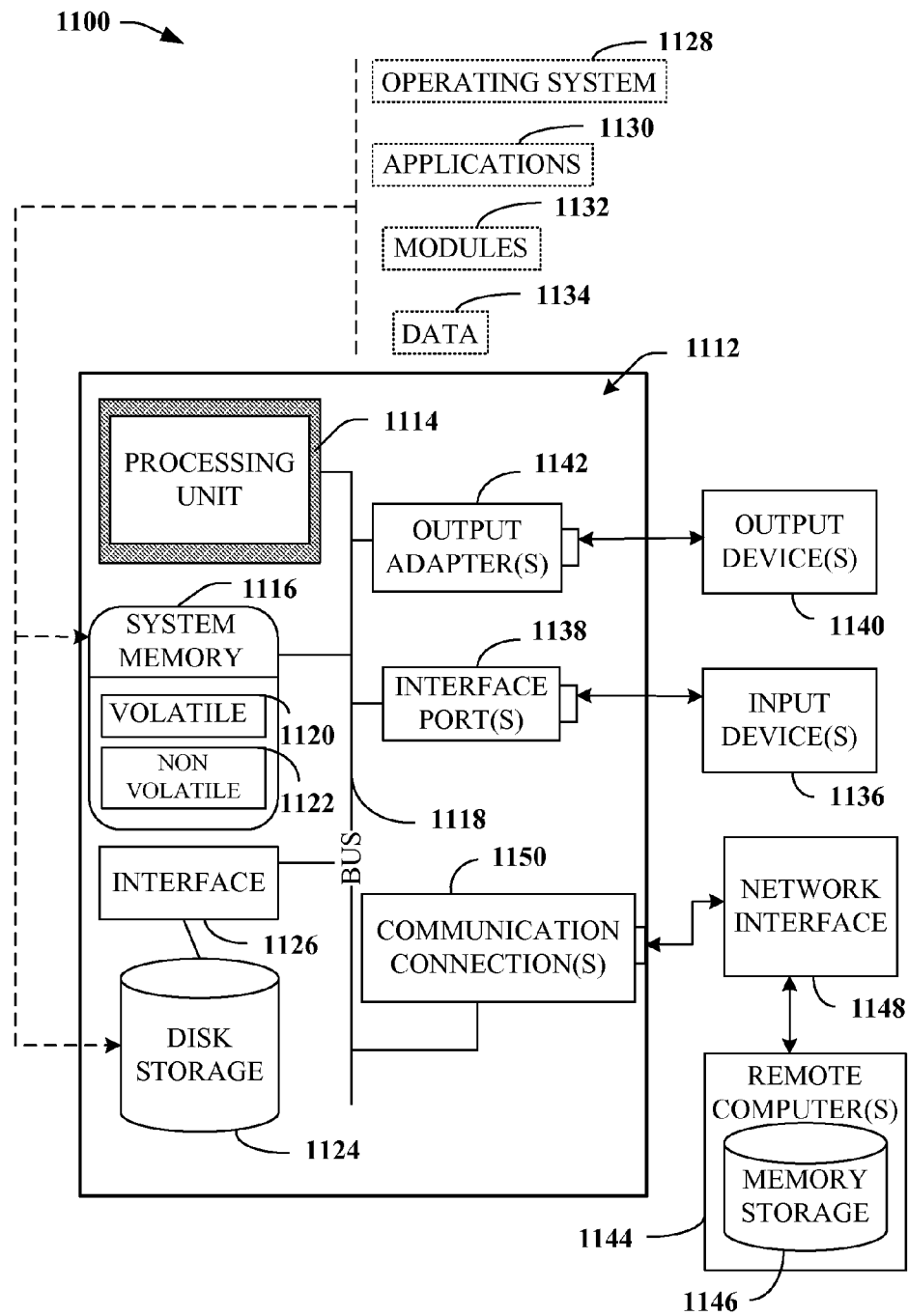
FIG. 11 illustrates a block diagram of a computing system operable to execute the disclosed systems and methods, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented, e.g., various processes associated with FIGS. 1-10. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media, networked attached storage (NAS), e.g., SAN storage, etc. FIG. 11 illustrates, for example, disk storage 1124. Disk storage 1124 includes, but is not limited to, devices like a magnetic disk drive, floppy disk drive, tape drive, Jaz drive, Zip drive, LS-110 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software includes an operating system 1128. Operating system 1128, which can be stored on disk storage 1124, acts to control and allocate resources of computer 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1114 through system bus 1118 via interface port(s) 1138. Interface port(s) 1138 include, for example, a serial port, a parallel port, a game port, and a universal serial bus (USB). Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one memory storing computer-executable instructions; and
at least one processor, communicatively coupled to the at least one memory, which facilitates execution of the computer-executable instructions to at least:
receive, from a customer of a group of customers corresponding to respective virtual storage appliances, a request comprising information representing at least one requirement for a virtual storage appliance (VSA) of the respective virtual storage appliances;
based on the request, provision a license key for the VSA and a newly provisioned portion of storage from a storage system; and
programmatically inject the license key into the VSA to enable access and use of the newly provisioned portion of the storage by the VSA.

2. The system of claim 1, wherein the information represents one or more of the VSA or the newly provisioned portion of the storage.

3. The system of claim 2, wherein the information represents at least one of a first geographical location of the VSA or a second geographical location of the newly provisioned portion of the storage.

4. The system of claim 1, wherein the request defines a performance criterion of at least one resource corresponding to the VSA.

5. The system of claim 1, wherein the at least one processor further facilitates the execution of the computer-executable instructions to provision the VSA utilizing the newly provisioned portion of the storage.

6. The system of claim 1, wherein the at least one processor further facilitates the execution of the computer-executable instructions to create, based on the newly provisioned portion of the storage, a boot image to facilitate configuration of the VSA.

7. The system of claim 1, wherein the at least one processor further facilitates the execution of the computer-executable instructions to dynamically allocate the VSA in a hypervisor cluster as a virtual machine.

8. The system of claim 1, wherein the at least one processor further facilitates the execution of the computer-executable instructions to configure a configurable device of a cloud based communication network to facilitate the access of the newly provisioned portion of the storage by the VSA via a storage management service.

9. The system of claim 1, wherein the at least one processor further facilitates the execution of the computer-executable instructions to authorize, using the license key, the access of the newly provisioned portion of the storage.

10. The system of claim 1, wherein the at least one processor further facilitates the execution of the computer-executable instructions to monitor, based on the access of the newly provisioned portion of the storage, at least one of: a performance of at least one of the VSA or the newly provisioned portion of the storage, or a status of the at least one of the VSA or the newly provisioned portion of storage.

11. A method, comprising:
receiving, by a system comprising at least one processor, a first request from a customer of customers associated with virtual storage appliances, wherein the first request comprises information representing one or more requirements for a virtual storage appliance (VSA) of the virtual storage appliances;
in response to the receiving, provisioning, by the system, a license key for the VSA and provisioning, by the system, a storage space from a storage system; and
programmatically adding, by the system, the license key into the VSA for facilitating access and use of the storage space by the VSA.

12. The method of claim 11, wherein the receiving comprises receiving a second request for at least one of the VSA or at least a portion of the storage space.

13. The method of claim 11, further comprising:
allocating, by the system, at least a portion of the storage space to the VSA.

14. The method of claim 11, further comprising:
creating, by the system, a snapshot of a boot drive of the VSA on a tier of storage of the storage system.

15. The method of claim 11, further comprising:
allocating, by the system, the VSA in a hypervisor cluster as a virtual machine.

16. The method of claim 11, further comprising:
monitoring, by the system based on the access, at least one of a performance or a status of at least one of the VSA or the storage space.

17. A computer-readable storage medium comprising instructions that, in response to execution, cause a system including at least one processor to perform operations, comprising:
receiving, from a customer of a group of customers associated with respective virtual storage appliances, a request comprising requirements for a virtual storage appliance (VSA) of the respective virtual storage appliances;
provisioning, based on the request, a license key for the VSA and a newly provisioned portion of storage from a storage system; and
programmatically injecting the license key into the VSA for enabling access and use of the newly provisioned portion of the storage by the VSA.

18. The computer-readable storage medium of claim 17, wherein the operations further comprise:
provisioning the VSA utilizing at least a portion of the newly provisioned portion of the storage.

19. The computer-readable storage medium of claim 17, wherein the operations further comprise:
dynamically configuring at least one of an encryption component or a quality of service component to facilitate, via the access, compliance to a service level agreement.

20. The computer-readable storage medium of claim 17, wherein the enabling the access comprises dynamically configuring one or more network components of the VSA comprising at least one of a virtual host bus adapter or a virtual network interface card.

* * * * *